Sept. 7, 1937.   H. DALLMANN   2,092,640
DEVICE FOR MEASURING THE DENSITIES OR PRESSURES OF FLUIDS
Filed May 6, 1936
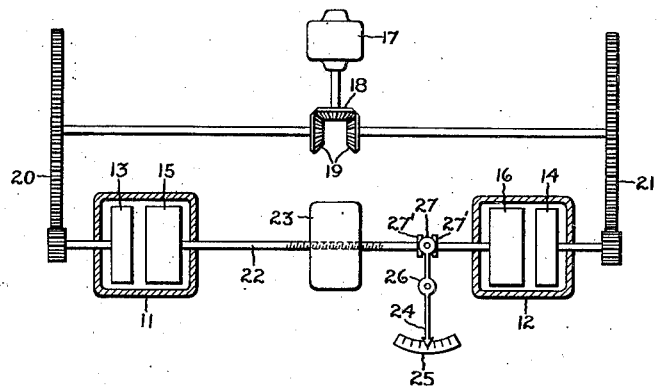
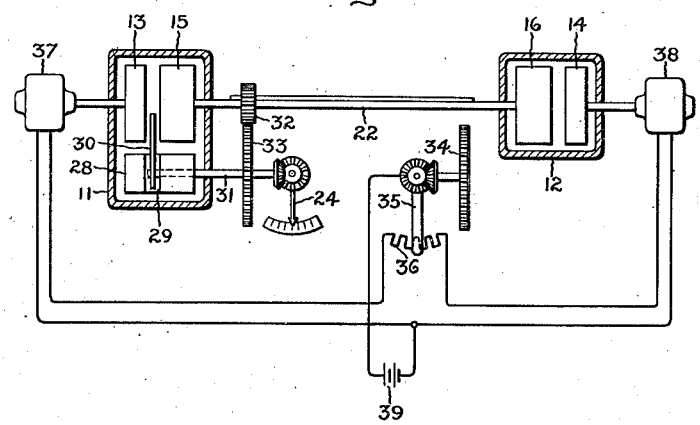
Inventor:
Herbert Dallmann,
by Harry E. Dunham
His Attorney.

Patented Sept. 7, 1937

2,092,640

UNITED STATES PATENT OFFICE 2,092,640

DEVICE FOR MEASURING THE DENSITIES OR PRESSURES OF FLUIDS

Herbert Dallmann, Berlin-Karlshorst, Germany, assignor to General Electric Company, a corporation of New York Application May 6, 1936, Serial No. 78,277
In Germany May 11, 1935

3 Claims. (Cl. 265—44)

My invention relates to devices for measuring the densities or pressures of fluids and concerns particularly arrangements for comparing the densities of two gases or other fluids.

My invention has for its principal object the provision of a gas density measuring device of high sensitivity and accuracy with sufficient indicating torque for operating telemetric devices, if desired.

It is an object of my invention to eliminate bearing friction of linkages and to reduce causes of friction to a minimum.

A further object of my invention is to provide an arrangement in which the element driving the indicator is capable of making several revolutions in order to increase the available power for operating the indicator.

Still another object of my invention is to provide a compensating arrangement for equalizing the torques produced in the two units to which two gases to be compared are introduced.

Other and further objects and advantages will become apparent as the description proceeds.

In carrying out my invention in its preferred form, I provide a pair of chambers for the reception of two gases to be compared, one of which may be a standard, and I provide in the chambers motor-driven blower wheels and measuring wheels hydraulically coupled thereto. In using the term "hydraulically" in the description and claims I do not mean to include only coupling by transmission of force through a liquid, but I mean to include also coupling by reason of force transmitted through any other fluid such as a gas or a vapor. The measuring wheels are directly connected by a common shaft in order to reduce friction to a minimum and to eliminate entirely linkages and the attendant bearing friction thereof. A compensating arrangement is provided, which is driven by the common shaft of the measuring wheels, for equalizing the torques exerted on the measuring wheels in the two chambers and the arrangement is such that several revolutions of the shaft are made in adjusting the compensator throughout the entire range of the apparatus.

A better understanding of my invention may be obtained by referring to the following detailed description together with the accompanying drawing and the features of my invention which are believed to be novel and patentable will be pointed out in the claims appended hereto. In the drawing, Fig. 1 is a schematic diagram of one embodiment of my invention in which torques are equalized by varying the relative spacings between the blower and measuring wheels in two chambers and Fig. 2 represents schematically another embodiment of my invention in which modified forms of torque-equalizing arrangements are employed.

Referring now more in detail to the drawing in which like reference characters are utilized throughout to designate like parts, I provide a pair of gas-receiving chambers 11 and 12. The gases or fluids to be compared may be introduced into the chambers 11 and 12 in any desired manner and such arrangements not constituting a part of my invention are not shown in the drawing. The chambers 11 and 12 contain motor-driven blower or impeller wheels 13 and 14 and measuring wheels 15 and 16, respectively. The wheels 13 to 16 may be of the turbine type carrying vanes or buckets or, if desired, may have relatively smooth surfaces and be so closely spaced as to produce viscosity drag between the blower and measuring wheels.

The blower wheels 13 and 14 are driven in opposite directions in order to exert opposing torques on the measuring wheels 15 and 16. In the arrangement of Fig. 1, the blower wheels 13 and 14 are driven at the same speed and, in order to insure the equality of speed, a single motor 17 may be employed for driving the blower wheels 13 and 14 through a bevel gear 18, a pair of bevel gears 19 driven in opposite directions by the bevel gear 18, and gears 20 and 21 connected to the bevel gears 19.

The measuring wheels 15 and 16 are directly connected by means of a common shaft 22, the center portion of which is threaded and engages an internally threaded stationary member 23. The threads in the shaft 22 and the member 23 are so cut that, when the shaft 22 is rotated, it tends to travel away from the blower wheel, producing the predominating torque. The shaft 22 obviously rotates in the same direction as the blower wheel exerting the greater torque on its corresponding measuring wheel. A pointer 24 cooperating with a scale 25 is connected in any suitable manner to the shaft 22 so as to be deflected in response to axial motion of the shaft 22. For example, the pointer 24 may be pivoted at 26 and have its end 27 ride between the pair of collars 27' on shaft 22.

It will be understood that, as the shaft 22 is caused to travel axially by threading through the member 23, it will approach more closely the blower wheel which has been producing the smaller torque, thereby increasing the torque exerted by such blower wheel and reducing the torque of the other blower wheel. Accordingly, the axial motion of the shaft 22 will continue until the torque of one blower wheel has been reduced and the torque of the other blower wheel has been increased sufficiently to equalize the two torques. The resultant axial position of the pointer 22 is consequently a measure of the ratio of the densities of the gases in the chambers 11 and 12.

If a standard gas, such as air at a fixed pressure, is introduced into the chamber 11, the scale 25 may be calibrated to afford a measure of the absolute density of the gas introduced into the chamber 12 or vice versa. If the same gases are introduced into the chambers 11 and 12 but at different pressures, the apparatus may be used for comparing pressure as well as density since, of course, the density of a gas varies with its pressure. Likewise, if the two gases to be compared are at the same pressure, it is unnecessary to correct for variations in absolute pressure since, within reasonable limits, the densities of two gases remain proportional regardless of like variations in the pressures of both gases.

It will be apparent that, by providing a fine or small pitch thread for the members 22 and 23, a large number of revolutions of the shaft 22 may be utilized for effecting the compensation and, in this manner, very little power will be required at the measuring wheels 15 and 16 for compensation or for operating the pointer 24. If desired, therefore, the pointer 24 may be connected to a rheostat or to other suitable apparatus for operating a telemeter or for producing records on a record chart and the like.

In Fig. 2, I have illustrated modified arrangements for equalizing the torques of the two units contained in the chambers 11 and 12. In accordance with one arrangement for producing equalization or compensation of torques, I may increase the size of the chamber 11 to provide space for a block 28 with a slot 29 for receiving a baffle plate 30 carried by a spindle 31 journalled in the block 28. The baffle plate 30 is adapted to be interposed between the blower wheel 13 and the measuring wheel 15 in order to vary the torque transmitted to the measuring wheel 15 by the blower wheel 13. The spindle 31 may be connected in a suitable manner as by a pinion 32 and a gear 33 to the common shaft 22 of the measuring wheels 15 and 16. The pointer 24 would then be carried by the spindle 31. It will be apparent that, while the torques produced in the units 11 and 12 are unequal, the shaft 22 will be rotated, rotating the spindle 31 until the baffle plate 30 is moved into such a position as to make the torque of the unit 11 equal to that of the unit 12.

It will be understood that the blower wheels 13 and 14 may be driven in the manner illustrated in Fig. 1. However, my invention is not limited to this specific arrangement and the blower wheels 13 and 14 may be driven at different speeds with a fixed speed ratio or, if desired, the speed ratio may be varied in order to obtain equalization of the torques instead of utilizing a baffle plate 30 or utilizing axial motion of the shaft 22 for torque equalization. For example, the pinion 32 may be moved to another position on the shaft 22 to mesh with a gear 34 connected to a movable contact 35 cooperating with a resistor 36 connected into the leads of two blower driving motors 37 and 38 energized by a common source 39. Each of the motors 37 and 38 has one of its input terminals connected to one end of the resistor 36 and the movable contact 35 is connected to one of the terminals of the source 39 so that rotation of the shaft 22, producing motion of the contact 35, varies the relative amount of resistance in the leads of the motors 37 and 38 and thereby varies their relative speeds until the torques produced by the blowers 13 and 14 are equalized. In this case, the resultant position of the contact 35 serves as an indication of the relative densities of the gases in the chambers 11 and 12.

It will be understood that it will be desirable to maintain the chambers 11 and 12 at the same temperature in order to eliminate the effect of temperature variations on the density of the gases.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A device for determining the ratio between the densities of two fluids comprising in combination, a chamber for the reception of one of said fluids, a second chamber for the reception of the other of said fluids, motor-driven impeller wheels in each of said chambers, measuring wheels in each of said chambers hydraulically coupled to said impeller wheels, said measuring wheels being directly connected by a common shaft, and means responsive to rotation of said measuring wheels for varying the relative spacings of the impeller and measuring wheels in the two chambers in order to equalize the torques exerted by the impeller wheels on the two measuring wheels.

2. A device for determining the ratio between the densities of two fluids comprising in combination, a chamber for the reception of one of the fluids, a second chamber for the reception of the other of the fluids, two oppositely rotating motor driven impeller wheels, one in each of said chambers, two directly connected measuring wheels, one in each of said chambers, hydraulically coupled to said impeller wheels, an adjustable baffle plate in one of said chambers interposable between the impeller wheel and the measuring wheel in the chamber, and a driving connection between said measuring wheels and said baffle plate for varying the position thereof to vary the torque transmitted to the associated measuring wheel in order to equalize the torques exerted on said measuring wheels by said impeller wheels.

3. A device for determining the ratio between the densities of two fluids comprising in combination, a chamber for the reception of one of the fluids, a second chamber for the reception of the other of the fluids, two oppositely rotating motor-driven impeller wheels, one in each of said chambers, two directly-connected measuring wheels, one in each of said chambers, hydraulically coupled to said impeller wheels, and means responsive to the rotation of said measuring wheels for equalizing the torques exerted on said measuring wheels by said impeller wheels.

HERBERT DALLMANN.